Figure 1:
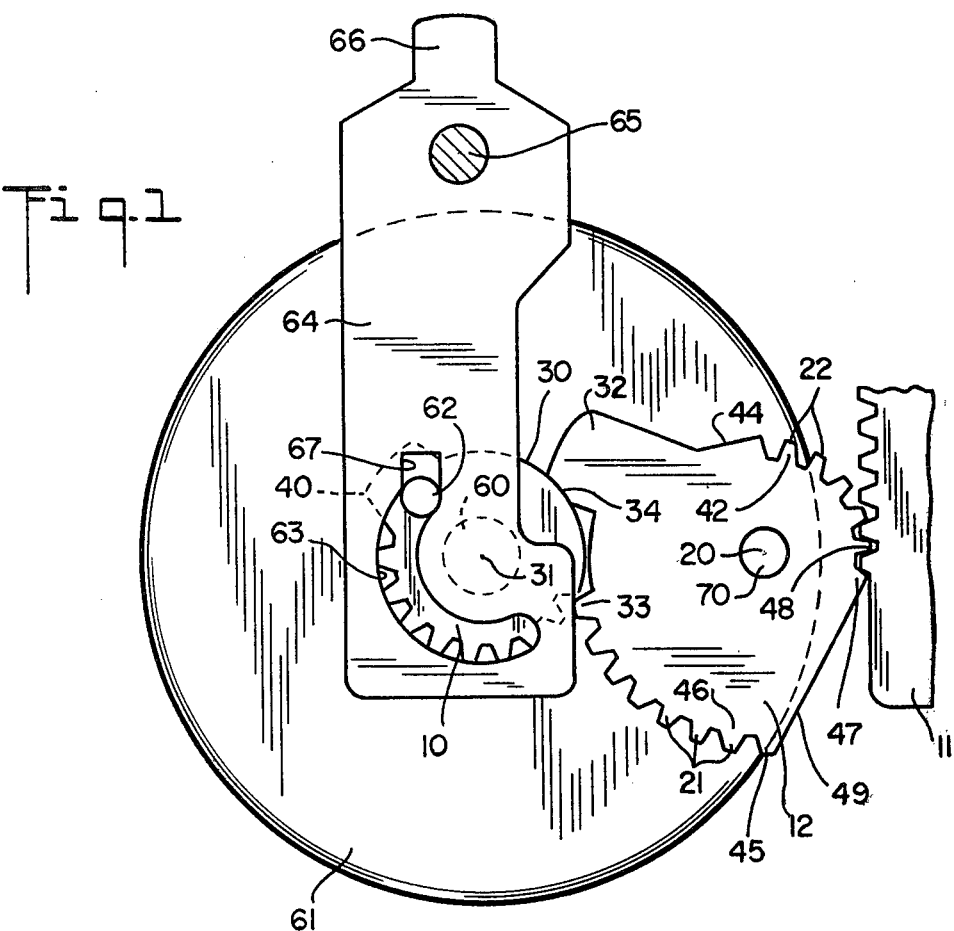

United States Patent [19]

Lowe

[11] 4,258,580
[45] Mar. 31, 1981

[54] GEAR ASSEMBLY FOR DRIVING A RACK

[75] Inventor: Lynnwood Lowe, Darien, Conn.

[73] Assignee: Pitney Bowes Inc., Stamford, Conn.

[21] Appl. No.: 89,350

[22] Filed: Oct. 30, 1979

[51] Int. Cl.³ .................... F16H 21/44; F16H 55/17
[52] U.S. Cl. .................................. 74/109; 74/422; 74/437; 74/462
[58] Field of Search ............... 74/414, 422, 421 R, 74/437, 457, 460, 462, 109, 89.16, 89.17

[56] References Cited

U.S. PATENT DOCUMENTS

| | | | |
|---|---|---|---|
| 1,619,389 | 3/1927 | Winters | 74/109 |
| 2,599,934 | 6/1952 | Opocensky | 74/414 |
| 3,365,965 | 1/1968 | French | 74/437 |
| 3,882,735 | 5/1975 | Shimodaira et al. | 74/109 |
| 3,961,517 | 6/1976 | DiMaio | 74/89.17 |
| 4,050,374 | 9/1977 | Check | 101/91 |

FOREIGN PATENT DOCUMENTS 38243   5/1922   Fed. Rep. of Germany ............ 74/48
37689  10/1923   Norway ................................. 74/414

Primary Examiner—Lawrence J. Staab
Attorney, Agent, or Firm—David E. Pitchenik; William D. Soltow, Jr.; Albert W. Scribner

[57] ABSTRACT

A gear assembly has a driving pinion, a rack and an intermediate gear coupling the pinion and rack. The teeth of the pinion, gear and rack are of the same pitch, the teeth of the intermediate gear being separated into one sector of teeth which engage the pinion and another sector of teeth which engage the rack. The axis of the intermediate gear is off-center, the radii of curvature of the pitched circles of the two sectors of the intermediate gear are different, and the teeth of the two different sectors of the intermediate gear are not integrally related to the circumference of the respective pitched circles.

8 Claims, 2 Drawing Figures

GEAR ASSEMBLY FOR DRIVING A RACK

This invention is directed to a gearing arrangement and is more particularly directed to a specific gearing arrangement especially adapted for use in postal meters, such as, for example, in the electronic postal meter disclosed in U.S. Pat. No. 4,050,374. It will of course be apparent that the invention may be advantageously employed in other applications.

In the above patent, a stepping motor is provided for driving a rack, the rack in turn driving a gear-locking assembly and setting gear along a spline shaft, to enable the positioning of the assembly such that postage printing meter wheels can be sequentially set by a further stepping motor driving the splined shaft. The locking assembly includes fixed gear teeth on the sliding element engageable with the setting gears for printing wheels other than the one being set at a given time.

In the provision of the stepping motor for driving the control rack, certain restrictions are placed upon the dimensions and positioning of the components, due to space requirements in the postage meter. In one arrangement it was thus necessary to locate the stepping motor such that it was not possible to directly drive the rack by pinion gear on the motor shaft, but an intermediate gear was necessary. This restriction on the locations of elements thereby fixed the distance between the shaft axis of the motor, and the pitch line of the rack teeth.

In this arrangement, further requirements also had to be met. Thus, the angular displacement of the shaft of the stepping motor, for each step, was fixed by the design of the motor itself, and the required movement of the locking assembly and setting gear, and hence the rack, for each step of the stepping motor, was also fixed.

It was found that these requirements could be met by conventional gear design technology, assuming complete design freedom on the teeth of the gear. The conventional design resulted, however, in the provision of an intermediate gear between the motor pinion and the rack that had an excessive number of teeth, and that the teeth were too small to effectively and reliably transfer the necessary forces in the postage meter, such that reliability of the postage meter could be insured.

Attempts were made to increase the size of the teeth, but this led to solutions having specialized teeth, so that the cutters for the teeth would have to be specially designed. This solution therefore led to an undesirable increase in the cost of the system, as well as to considerable delays resulting from the necessity for special ordering of the non-standard cutters.

Therefore, in accordance with the invention, it was determined to employ standard cutters for the gear teeth, such that the same cutters could be employed for the stepping motor pinion gear as well as for the rack and intermediate gear.

In accordance with the invention, this solution has been rendered possible by the use of gear teeth of the same standard pitch tooth configuration for all of the gears of the assembly, whereby the index number of the teeth on each segment of the intermediate gear are not integrally related to the product of the pitch times the pitch diameter, i.e., it would not be possible to form a complete continuously rotating gear with the standard teeth employed, for the given radius of the segments upon which the gear teeth were provided.

Further, in accordance with conventional design, it is known to provide a butterfly gear (i.e., a gear having gear teeth only in two generally opposed segments), with the two gear tooth segments having the same radius of curvature. In the gear system in accordance with the invention, however, this is no longer possible, with the result that it is now necessary to move the pivot center of the intermediate gear closer to the rack. This results in an intermediate gear with opposite tooth segments having different radii of curvature, the axis of rotation of the gear being of course displaced toward the segment having teeth with the shorter pitch radius of curvature tangent at the pitch line locus of the rack teeth.

Figure 2:
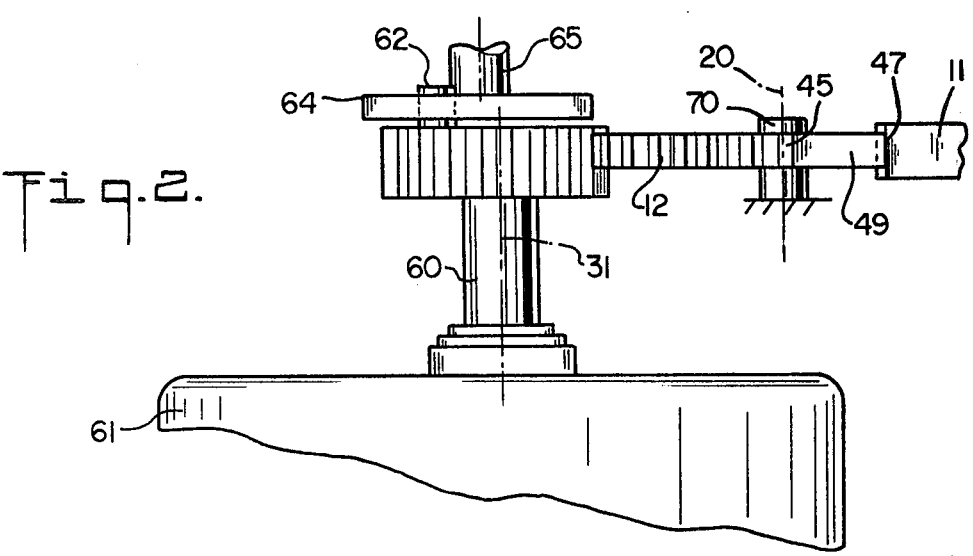

In order that the invention will be more clearly understood, it will now be disclosed in greater detail with reference to the accompanying drawings, wherein;

FIG. 1 is a top view of a gearing assembly in aquittance with the invention; and FIG. 2 is a side view of a portion of the arrangement of FIG. 1.

Referring now to the drawings, the gear assembly of the present invention thereby is comprised of a drive pinion gear 10, a rack 11 displaced a given distance therefrom, and an intermediate gear 12 coupled between the pinion gear 10 and the rack 11. The teeth of all of these gears is of the standard form, so that the teeth may be cut by a common standard cutter. The pivotal axis 20 of the intermediate gear is displaced from the center between the teeth 21 thereof engaging the drive pinion and the teeth 22 thereof engaging the rack 11, preferably toward the rack, such that the radii of curvature of the locus of teeth on opposite sides of the intermediate gear are different. The teeth 22 engaging the rack have preferably the smallest radius of curvature for the radius of the teeth locii. In addition, the index number of the teeth of the intermediate gear are not integrally related to the circumference of the respective pitch circle about the rotational axis 20 of the intermediate gear 12.

The present invention overcomes the problems of assembly and increased cost which would be occasioned by use of conventional techniques, wherein multiple intermediate gears interconnected on a common shaft, segment gears indexed for whole number of teeth but having decimal pitches, or non-integral pitches or indices of teeth, would be provided.

In order to satisfy a further requirement of a postal meter which may incorporate the present invention, it was found possible to incorporate a blocking feature in the gear assembly, using a modification of the principle employed in conventional Geneva gear assemblies. Thus, a portion 30 of the driving pinion circumference does not have gear teeth cut therein, in order to form a blocking or camming surface on this gear coaxial with the drive shaft axis 31. The teeth of the intermediate gear that would otherwise have mated with this portion 30 of the drive gear are of course also omitted, and the intermediate gear is thereby provided with a projection 32 angularly displaced from the last tooth 33 thereof and having a concave locking surface 34 with a center of curvature and radius of curvature substantially that of the portion 30 of the driving gear.

As a further feature, a radially outward extending projection 40 may be provided on the camming surface of the driving gear, engageable with the projection 32 of the intermediate gear at a given angular displacement, to limit the angular displacement of the driving gear thereby to avoid any possibility of jamming of the gears.

In the arrangement of the present convention illustrated in FIG. 1, the last tooth 42 of the intermediate gear adapted to engage the rack is separated from the projection 32 by a projection 44 having a pitch circle substantially that of the teeth 22. Further, a projection 45 is spaced from the last tooth 46 engageable with the pinion, and a projection 47 is provided spaced with the last tooth 48 engageable with the rack 11, the projections 45 and 47 being joined by a substantially straight edge 49 of the intermediate gear. The projection 45 extends radially at about the pitch circle of the gear teeth 21, while projection 47 extends at about ½ the height of the gear teeth 22. These projections aid in the protection of the adjacent teeth from damage during the manufacture of the intermediate gear and the subsequent assembly of the gear.

The drawings further show a few features of the gear assembly of the invention in use, for example, in a postal meter. Thus, as disclosed in co-pending patent application Ser. No. 089,423, filed Oct. 30, 1979 an arrangement is disclosed wherein a sheet metal mechanical latch for a postal meter is responsive to operation of a stepping motor, for inhibiting operation of the postal meter under certain conditions. The gear assembly of the present invention may advantageously employed in such a system. Thus, the driving gear 10 may be mounted on a shaft 60 to be rotationally driven by a bank selection stepping motor 61 of the type employed in the application Ser. No. 89,423, filed Oct. 30, 1979 and U.S. Pat. No. 4,050,374. In this arrangement, the rack 11 is adapted to be connected to the printing wheel gear locking assembly of U.S. Pat. No. 4,050,374. Further, a pin 62 is provided on the driving gear 10, preferably in the region of the projection 40, the pin 62 matching a slot 63 in a pivoted lever 64. The lever 64 is pivoted at fixed pin 65, and has an extension 66 adapted to engage a further mechanism (not shown) for effecting the mechanical latching of a driving gear of the postal meter printing mechanism. This latter mechanism is not illustrated herein, since it does not form a part of the present invention per se. The slot 63 has a concave portion at one end, whereby the lever 64 is held in a fixed position when the pin 62 engages this concave slotted portion. The other end 67 of the slot 63 is straight, however, so that at one end of the displacement range of the stepping motor the lever 64 may engage this straight portion to effect the rotation of the lever 64. In the arrangement of the present invention, the intermediate gear 12 may be mounted for rotation on a fixed pin 70 as shown in the drawings.

In accordance with the invention, the number of index teeth on the intermediate gear sector engaging the rack equals $(2Pd - n_1)/(\pi n_1/SP + 1)$, and the number of index teeth in the intermediate gear sector engaging the drive gear equals $(2Pd - n_1)/(SP/\pi n_1 + 1)$ wherein:

P is the pitch of the teeth,
S is the theoretical linear travel of the rack per revolution of the motor.
$n_1$ is the number of possible teeth on the drive gear,
d is the distance between the pitch line of the rack and the driving axis of the pinion.

In one actual embodiment of the invention, the gear teeth had the following parameters:

The driving gear pinion 10:
18 teeth (index)
28 pitch 0.642857" pitch dia.
20° pressure angle
0.60409" base cir. dia.
0.05161" cir. t.t.
0.06171" wire
0.72798" meas. over wires
0.7143" o.d.
0.0806" whole depth The intermediate gear teeth 21 engaging the drive gear:
35.31849 teeth (index)
28 Pitch 1.26137" pitch dia.
20° pressure angle
1.18530" base cir. dia. p1 0.0561" cir. t.t.
0.06171" wire dia.
0.67384" meas. over (1) wire
1.3328" o.d.
0.0806" whole depth The teeth 22 of the intermediate gear engaging the rack:
19.74401 teeth (index)
28 pitch 0.7051432" pitch dia.
20° pressure angle
0.662618" base cir. dia
0.0561 " cir. t.t.
0.06171" wire dia. #5
0.39523" meas. over (1) wire
0.77657" o.d.
0.00806" whole depth In this example P=28, $n_1$=18, S=1.12900986"and d=1.3046875".

In addition the distance between the axis of the driving gear and the axis of the intermediate gear was 0.9521 inches. The teeth of the rack were designed such that a 0.06171 inch diameter wire would project 0.0083 inches from the line defined by the top of the teeth.

While, as discussed above, it is preferred that the teeth of the pinion, gear and rack be of the same pitch, the invention is also directed to arrangements of this type wherein the pitches between the mating teeth are the same, but the pitch of the rack and rack sector gear is different than that of the pitch of the pinion and pinion sector of the intermediate gear. In other words, it has been found possible, when employing the teachings of the present invention as above disclosed, that the two sets of mating teeth may have different pitches, without changing the pivot center, pitch diameters, base circle diameters or pitch line of the rack. In other words, the pitch diameter of the sector gear engaged in the rack is independent of the pitch of the rack and the rack sector gear. Thus, the pitch diameter and base circle diameter of the intermediate gear sector engaged in the rack is constant for a given pitch of the intermediate gear sector engaging the pinion, the distance d between the pitch line of the rack and the driving axis of the pinion, the number of possible drive teeth on the drive gear and the distance S corresponding to the theoretical linear travel of the rack for each revolution of the motor. Thus, if $P_1$ the pitch of the rack and sector gear engaged in the rack is 30, and $P_2$, the pitch of the pinion and sector gear engaging the pinion is 28, and S, d and $n_1$ are the same as in the above example, then it can be shown that the pitch diameter and base circle diameter are the same as in the above noted 28 pitch system. In a still further example, if $P_1$=20, the pitch diameter and base circle diameter are also the same as in the above noted 28 pitch system.

In this more generalized statement of the invention, if the rack and intermediate gear sector engaging the rack have a diametral pitch $P_1$ and the diametral pitch of the pinion and the intermediate gear sector intrameshed therewith is $P_2$; then the number of index teeth on the intermediate gear engaging the rack equals $P_1(2P_2d-n_1)/(\pi n_1/S+P_2)$. In this case, the number of index teeth on the intermediate gear sector engaging the pinion equal to $(2P_2d-n_1)/(SP_2/+n_1+1)$.

While the invention has been disclosed and described with reference to a single embodiment, it will be apparent that the variations and modifications may be made therein, and it is therefore intended of the following claims to cover each such variation of modification as follows within the true spirit and scope of the invention.

What is claimed is:

1. A gear assembly comprising a driving pinion gear, a rack, and an intermediate gear having first and second opposite segments of teeth engaging the teeth of said pinion and the teeth of said rack respectively, the teeth of said driving gear, rack and intermediate gear having substantially the same pitch, the axis of rotation of the intermediate gear being closer to the pitch line of the rack than to the pitch circle of the pinion, whereby the radii of curvature of the teeth of the first and second segments of the intermediate gear are different, the index number of the teeth of the first and second segments of the intermediate gear being non-integrally related to the circumference of the respective pitch circles.

2. The gear assembly of claim 1 wherein said driving gear has a segment thereon with out gear teeth, said segment having a cylindrical camming surface coaxial with the driving gear at the radius of the peaks of the respective gear teeth, and wherein said intermediate gear has a portion thereon without teeth and alignable with said cylindrical surface, said portion having a projection with a concave surface of substantially the same radius and center of curvature as said camming surface.

3. The gear assembly of claim 1 wherein the number of index teeth in the intermediate gear adapted to intermesh with teeth of the rack is equal to $(2Pd-n_1)/(\pi n_1/SP+1)$, wherein P is the pitch of the teeth, S is the theoretical linear travel of the rack per revolution of the motor $n_1$ is the number of possible teeth on the drive gear, and d is the distance between the pitch line of the rack and driving axis of the pinion.

4. The gear assembly of claim 1 wherein the number of index teeth in the intermediate gear engageable with the drive gear is equal to $(2Pd-n_1)/(SP/\pi n_1+1)$, wherein P is the pitch of the teeth, S is the theoretical linear travel of the rack per revolution of the motor, $n_1$ is the number of possible teeth on the drive gear, and d is the distance between the pitch line of the rack and the driving axis of the pinion.

5. The gear assembly of claim 1 further comprising an off-center pin extending from the side of said pinion, and a lever having a fixed pivot axis, said lever having a slot engaging said pin, whereby said lever is moved in response to rotation of said pinion.

6. The gear assembly of claim 5, wherein said slot has a first arcuate portion permitting rotation of said driven gear without pivotal movement of said lever, and a second linear portion extending from said arcuate portion.

7. The gear assembly of claim 1, wherein said pinion has a segment, in the plane of the teeth thereof, wherein the teeth are omitted, said segment having a radius essentially equal to that of the peaks of the respective teeth, said intermediate gear having a projection in the plane of the respective teeth, said projection having an arcuate surface positioned to engage the surface of said segment of said driven gear at one angular displacement, said projection being spaced from the teeth of said intermediate gear adapted to engage the teeth of said pinion by a segment without teeth, said last mentioned segment having a radius to avoid contact thereof with said pinion.

8. Gear assembly comprising a driving pinion gear, a rack, and an intermediate gear having first and second opposite segments of teeth engaging the teeth of said pinion and the teeth of said rack respectively, the teeth of said driving gear and the portion of the intermediate gear engaged therewith having substantially the same pitch, the teeth of said rack and the portion of said intermediate gear engaged therewith having substantially the same pitch, the axis of rotation of the intermediate gear being closer to the pitch line of the rack than to the pitch circle of the pinion, whereby the radii of curvature of the teeth of the first and second segments of the intermediate gear are different, the index number of the teeth of the first and second segments of the intermediate gear being non-interrelated to the circumference of the respective pitch circles, the teeth of said pinion, rack, and the segments of the intermediate gear intermeshing said rack and pinion, having substantially the same pitch.

* * * * *